United States Patent
Saso et al.

(10) Patent No.: US 11,091,115 B2
(45) Date of Patent: Aug. 17, 2021

(54) AIR-BAG APPARATUS AND AIR-BAG SYSTEM

(71) Applicant: HONDA MOTOR CO., LTD., Tokyo (JP)

(72) Inventors: Takashi Saso, Wako (JP); Hiroyuki Ito, Wako (JP); Takayuki Shimizu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/794,294

(22) Filed: Feb. 19, 2020

(65) Prior Publication Data

US 2020/0290552 A1 Sep. 17, 2020

(30) Foreign Application Priority Data

Mar. 12, 2019 (JP) .............................. JP2019-045015

(51) Int. Cl.
| | |
|---|---|
| *B60R 21/231* | (2011.01) |
| *B60R 21/207* | (2006.01) |
| *B60R 21/21* | (2011.01) |
| B60R 21/01 | (2006.01) |

(52) U.S. Cl.
CPC ...... *B60R 21/23138* (2013.01); *B60R 21/207* (2013.01); *B60R 21/21* (2013.01); *B60R 2021/01231* (2013.01); *B60R 2021/23146* (2013.01)

(58) Field of Classification Search
CPC . B60R 21/207; B60R 21/23138; B60R 21/21; B60R 2021/23146
See application file for complete search history.

(56) References Cited

U.S. PATENT DOCUMENTS

| | | | | |
|---|---|---|---|---|
| 9,533,651 | B1* | 1/2017 | Ohno | B60R 21/0134 |
| 9,950,687 | B2* | 4/2018 | Kato | B60R 21/207 |
| 10,099,643 | B2* | 10/2018 | Sakakibara | B60N 2/686 |
| 10,189,431 | B2* | 1/2019 | Yamamoto | B60R 21/207 |
| 10,322,691 | B2* | 6/2019 | Ohmi | B60N 2/868 |
| 10,850,699 | B2* | 12/2020 | Dry | B60R 21/231 |
| 10,899,307 | B2* | 1/2021 | Lin | B60N 2/806 |
| 2020/0238937 | A1* | 7/2020 | Saso | B60N 2/643 |
| 2020/0290548 | A1* | 9/2020 | Kokeguchi | B60R 21/23138 |
| 2020/0290551 | A1* | 9/2020 | Shimizu | B60N 2/0232 |
| 2021/0061211 | A1* | 3/2021 | Jung | B60R 21/207 |

FOREIGN PATENT DOCUMENTS

JP 2014-141159 8/2014

* cited by examiner

*Primary Examiner* — Faye M Fleming
(74) *Attorney, Agent, or Firm* — Amin, Turocy & Watson, LLP (57) ABSTRACT

An air-bag apparatus includes an inflator that generates a gas at a time of an impact input; and a bag body that is inflated and expanded from a seat back of a vehicle seat upon supply of the gas from the inflator, wherein the bag body includes a pair of front extension parts each of which extends in a vehicle frontward direction from each of both sides in a width direction of the seat back, and a front bag that is provided continuously to the front extension part, that is expanded to a vehicle frontward side of an occupant seated on the vehicle seat, and that comes into contact with an upper part of a body of the occupant.

7 Claims, 6 Drawing Sheets

AIR-BAG APPARATUS AND AIR-BAG SYSTEM

CROSS-REFERENCE TO RELATED APPLICATION

Priority is claimed on Japanese Patent Application No. 2019-045015, filed on Mar. 12, 2019, the contents of which are incorporated herein by reference.

BACKGROUND

Field of the Invention

The present invention relates to an air-bag apparatus and an air-bag system.

Background

In the related art, an air-bag apparatus is known which is embedded in a vehicle seat and which expands a bag body so as to cover an upper body of an occupant when an impact is input to a vehicle and holds the occupant.

For example, Japanese Unexamined Patent Application, First Publication No. 2014-141159 discloses a side air-bag that is provided on an outer side part in a vehicle width direction in a seat back of a vehicle seat. This side air-bag includes a front bag part that holds a chest part and a front portion of a belly part of a seated occupant, a rear bag part that includes an inflator and that holds a shoulder part, a chest part, and a rear portion of the belly part of the seated occupant, and a lower bag part that holds a waist part of the seated occupant. The side air-bag having such a configuration inflates and expands the rear bag part including the inflator earlier and at a higher pressure than the front bag part. Thereby, a load received from the front bag part by the chest part and the front portion of the belly part that have a relatively a low resistance characteristic to a load is reduced while promptly holding the shoulder part, the chest part, and the rear portion of the belly part that have a relatively a higher resistance characteristic to a load than the chest part and the front portion of the belly part by the rear bag part.

SUMMARY

An air-bag apparatus is known in which a bag body is embedded in a steering wheel provided in front of a driver's seat or a console in front of a passenger seat. Such an air-bag apparatus receives an arm of an occupant by the bag body that is expanded and inflated from the steering wheel or the console at a time of collision of a vehicle. At this time, the body of the occupant whose waist part is held to the vehicle seat by the seat belt hits on the bag body inflated and expanded from the steering wheel or the console such that the head part, the shoulder part, and the chest part are swung frontward around the waist part. Therefore, it is desired to mitigate an impact when the occupant hits on the bag body.

An object of an aspect of the present invention is to provide an air-bag apparatus and an air-bag system capable of mitigating an impact that is applied on an occupant by a bag body inflated at a time of collision.

(1) An air-bag apparatus according to an aspect of the present invention includes: an inflator that generates a gas at a time of an impact input; and a bag body that is inflated and expanded from a seat back of a vehicle seat upon supply of the gas from the inflator, wherein the bag body includes a pair of front extension parts each of which extends in a vehicle frontward direction from each of both sides in a width direction of the seat back, and a front bag that is provided continuously to the front extension part, that is expanded to a frontward side of an occupant seated on the vehicle seat, and that comes into contact with an upper part of a body of the occupant, and the front bag includes a front lower bag part that comes into contact with a lower part below the upper part of the body of the occupant more weakly than the upper part or comes into no contact with the lower part.

(2) In the air-bag apparatus according to the above aspect (1), the pair of front extension parts may include: a pair of side bags each of which is expanded to each of both sides in a width direction of the body of the occupant, comes into contact with a side surface of the body, and is connected to the front bag; and a pair of upper bags each of which is expanded above the body of the occupant and comes into contact with an upper surface of a shoulder part of the occupant.

(3) In the air-bag apparatus according to the above aspect (2), the bag body may be provided to be inflated and expanded in an order of the side bag, the upper bag, and the front bag upon supply of the gas from the inflator.

(4) In the air-bag apparatus according to any one of the above aspects (1) to (3), a non-inflation part may be provided on part of the front bag.

(5) In the air-bag apparatus according to any one of the above aspects (1) to (4), a front extension part that is provided on a door side of a vehicle among the pair of the front extension parts may be formed to have a larger thickness in a width direction of the vehicle in an inflated and expanded state than a front extension part on an opposite side of the door side of the vehicle among the pair of the front extension parts.

(6) In the air-bag apparatus according to the above aspect (1), each of the pair of front extension parts may be expanded to each of both sides in a width direction of the vehicle seat to interpose a head part of the occupant and may be along a side surface and a front surface of the head part.

(7) An air-bag system according to another aspect of the present invention includes: the air-bag apparatus according to any one of the above aspects (1) to (6); and a second air-bag apparatus that is provided in front of the occupant, wherein the second air-bag apparatus includes: a second inflator that generates a gas at a time of an impact input; and a second bag body that is inflated and expanded upon supply of the gas from the second inflator, and the front bag of the bag body is inflated and expanded between the second bag body and the body of the occupant.

According to the above aspect (1), the front bag that is provided continuously to each of the pair of front extension parts each of which extends in the vehicle frontward direction from each of both sides in the width direction of the seat back is expanded to the vehicle frontward side of the occupant seated on the vehicle seat. Thereby, it is possible to reduce the amount of movement of the body of the occupant to the vehicle frontward direction.

Further, the front bag comes into contact with the upper part of the front surface of the body of the occupant. The upper part of the body of the occupant, that is, for example, the clavicle or a part, for example, from the top of the rib to several ribs has a high resistance characteristic to a load applied from the front as compared to a lower part than the several ribs. In this way, the front bag comes into contact with the upper part of the front surface of the body having a high resistance characteristic to a load. The front lower bag part weakly comes into contact with the lower part of the front surface of the body having a low resistance characteristic to a load, or the front bag comes into no contact with the lower part of the front surface of the body having a low resistance characteristic to a load. Thereby, it is possible to mitigate the impact which is received by the occupant even if the body of the occupant is displaced to swing frontward and hits the bag body at the time of collision.

According to the above aspect (2), the front extension part includes the side bag and the upper bag and thereby covers the upper portion of the side part of the body and the shoulder part of the occupant, and it is possible to mitigate the impact which is received by the occupant.

According to the above aspect (3), the bag body is inflated and expanded in the order of the side bag, the upper bag, and the front bag. Thereby, by the side bag being inflated and expanded first, it is possible to prevent the body of the occupant from being displaced laterally in the vehicle width direction and diagonally frontward, and the body of the occupant can be guided to displace toward the vehicle frontward direction. Next, by the upper bag being inflated and expanded, an upward displacement of the body of the occupant is prevented. Then, by the front bag being inflated and expanded, it is possible to prevent the upper part of the body of the occupant from being displaced in the vehicle frontward direction.

According to the above aspect (4), the non-inflation part is provided on part of the front bag, and thereby, it is possible to reduce the volume that is inflated and expanded by the gas inside the bag body. Thereby, the inflation and expansion of the bag body is quickly performed. Further, in the front bag, a surface of a portion that comes into contact with the upper part of the body of the occupant around the non-inflation part can be formed of a curved surface, and the load applied to the body of the occupant can be dispersed.

According to the above aspect (5), the front extension part provided on the door side is formed to have a larger thickness in the vehicle width direction in the inflated and expanded state than the front extension part on the opposite side. Thereby, the front extension part is interposed between the door and the side surface of the body of the occupant, and it is possible to enhance buffering characteristics in the inflated and expanded state of the front extension part on the door side. Further, in a case where the side surface of the body of the occupant hits the front extension part, the front extension part is also supported by a reaction force from the door. Thereby, it is possible to further reliably receive the occupant by the front extension part on the door side.

According to the above aspect (6), the pair of front extension parts are along the side surface and the front surface of the head part of the occupant, and thereby, it is possible to reduce the amount of movement of the head part of the occupant to the vehicle frontward direction. Thereby, it is possible to prevent the head part of the occupant from hitting a member and the like provided on a front part of the vehicle.

According to the above aspect (7), the bag body having the front bag that comes into contact with the upper part of the front surface of the body of the occupant is inflated and expanded between the occupant and the second bag body inflated and expanded in front of the occupant. Thereby, the bag body and the second bag body can receive the displacement of the body and the head part of the occupant such that the body and the head part are swung frontward around the waist part that is held by the seat belt, and it is possible to reduce the impact applied on the occupant.

DESCRIPTION OF EMBODIMENTS

Hereinafter, embodiments of the present invention will be described with reference to the drawings. In the drawings used below, an arrow FR indicates a frontward direction of a vehicle, an arrow UP indicates an upward direction of the vehicle, and an arrow LH indicates a leftward direction of the vehicle.

First Embodiment

Figure 1:
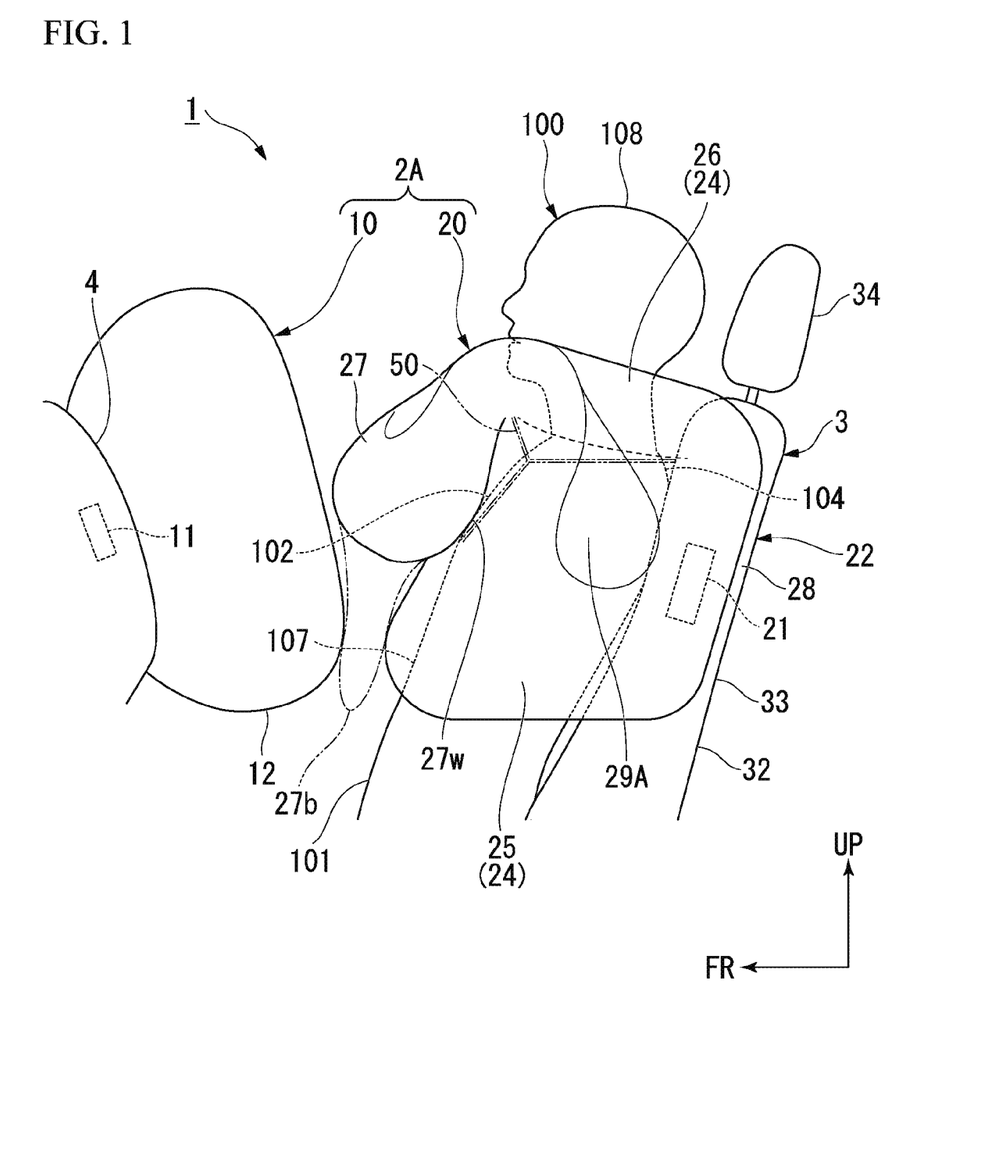
FIG. 1 is a side view showing part of a vehicle on which an air-bag apparatus and an air-bag system according to a first embodiment of the present invention are mounted.

FIG. 1 is a side view showing part of a vehicle that includes an air-bag apparatus and an air-bag system to which an embodiment of the present invention is applied.

As shown in FIG. 1, the vehicle 1 includes an air-bag system 2A inside a vehicle room. The air-bag system 2A includes a main air-bag apparatus (second air-bag apparatus) 10 that is provided on a steering wheel or a console 4 and a seat air-bag apparatus (air-bag apparatus) 20 that is provided on a vehicle seat 3.

The steering wheel or the console 4 is provided on a frontward side of the vehicle 1 (vehicle frontward direction) relative to the vehicle seat 3. The main air-bag apparatus 10 includes an inflator (second inflator) 11 and a bag body (second bag body) 12.

The inflator 11 generates a high-pressure gas upon an impact input to the vehicle. The inflator 11 is embedded in the steering wheel or the console 4.

The bag body 12 is accommodated inside the steering wheel or the console 4, for example, in a folded state or a wound state, and is inflated and expanded from the steering wheel or the console 4 to a rearward side of the vehicle 1 (vehicle rearward direction) upon supply of the gas from the inflator 11.

Figure 2:
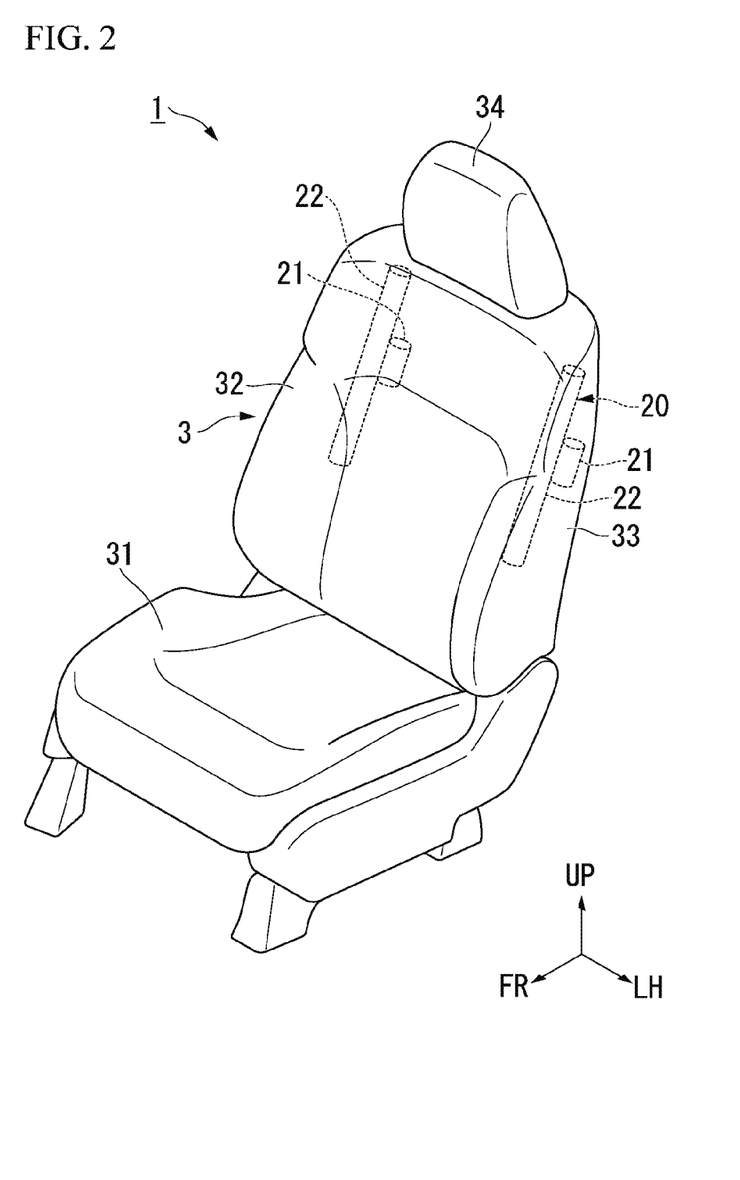
FIG. 2 is a perspective view showing a vehicle seat that includes the air-bag apparatus.

FIG. 2 is a perspective view showing a vehicle seat that includes the air-bag apparatus.

As shown in FIG. 2, the vehicle seat 3 on which the seat air-bag apparatus 20 is mounted is, for example, a driver's seat, a passenger seat, or the like. The vehicle seat 3 includes a seat cushion 31 that supports buttocks of an occupant and a seat back 32 that is connected to a rear end part of the seat cushion 31 and that supports an upper body (a body, a neck part, and a head part) of the occupant.

The seat cushion 31 includes a frame (not shown) that forms a skeleton of the seat cushion 31, a pad material (not shown) that is formed of, for example, an urethane foam or the like and that is mounted on the frame, and a cover (not shown) that is formed of, for example, a synthetic fiber, a leather, or the like and that covers the frame and the pad material. The seat back 32 is connected to a rear end part of the seat cushion 31 to be tiltable. The seat back 32 includes a seat back main body 33 that supports, for example, a waist part and a back part of the occupant and a head rest 34 that is attached to an upper end part of the seat back main body 33 and that supports, for example, a head part of the occupant. The seat back 32 is formed of a frame, a pad material, and a cover as well as the seat cushion 31. The seat back main body 33 and the head rest 34 may be integrally formed.

The seat air-bag apparatus 20 is embedded in a seat back 32. In the present embodiment, the seat air-bag apparatus 20 is embedded in the seat back main body 33. The seat air-bag apparatus 20 holds the upper part of the upper body of the occupant at the time of operation. The seat air-bag apparatus 20 includes an inflator 21 and a pair of bag bodies 22.

The inflator 21 generates a high-pressure gas at the time of an impact input to the vehicle. The inflator 21 is attached to a frame that forms the seat back 32.

Figure 3:
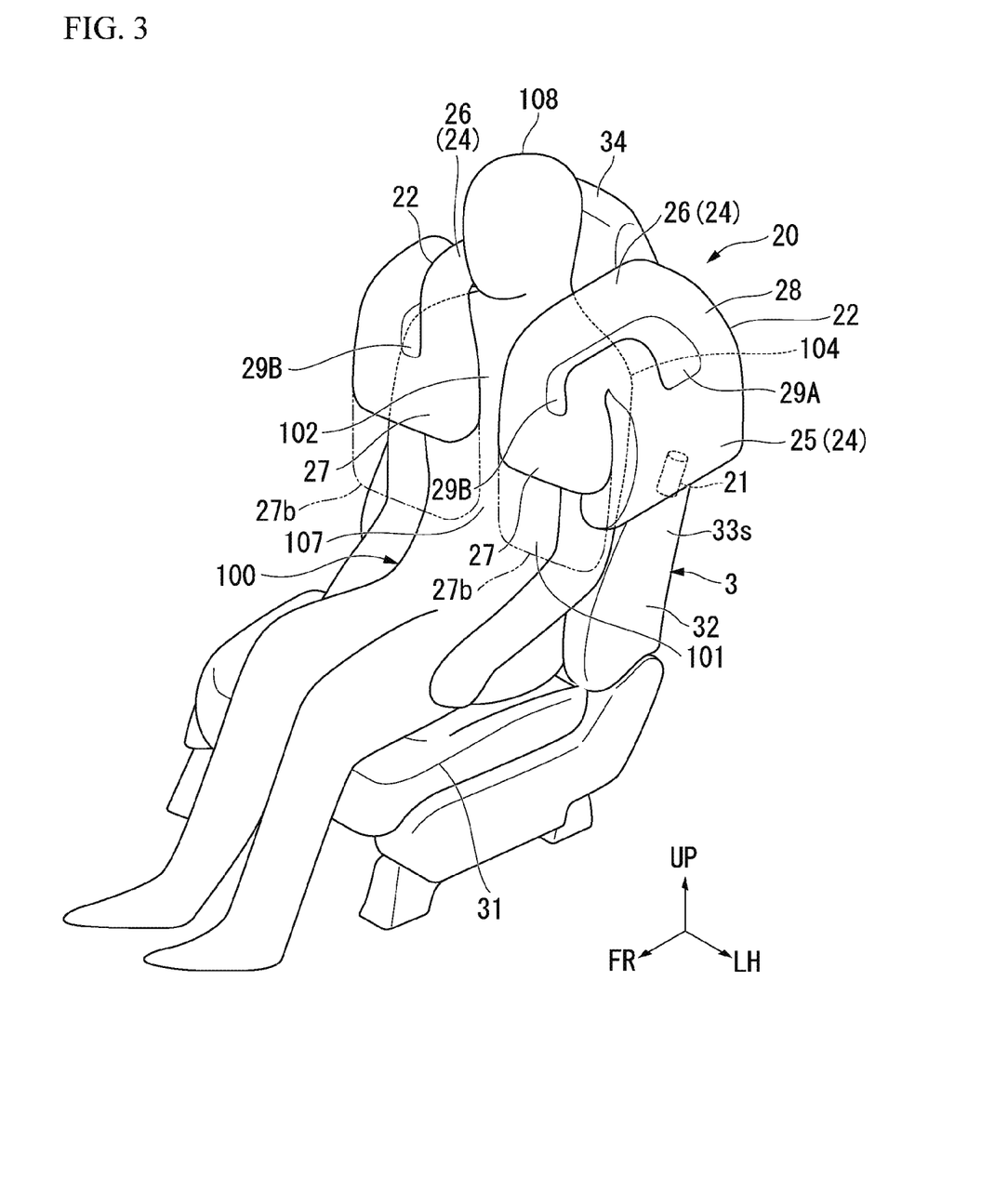
FIG. 3 is a view showing a state in which the air-bag apparatus is expanded and is a perspective view of the vehicle seat on which the air-bag apparatus of the embodiment is mounted.
Figure 4:
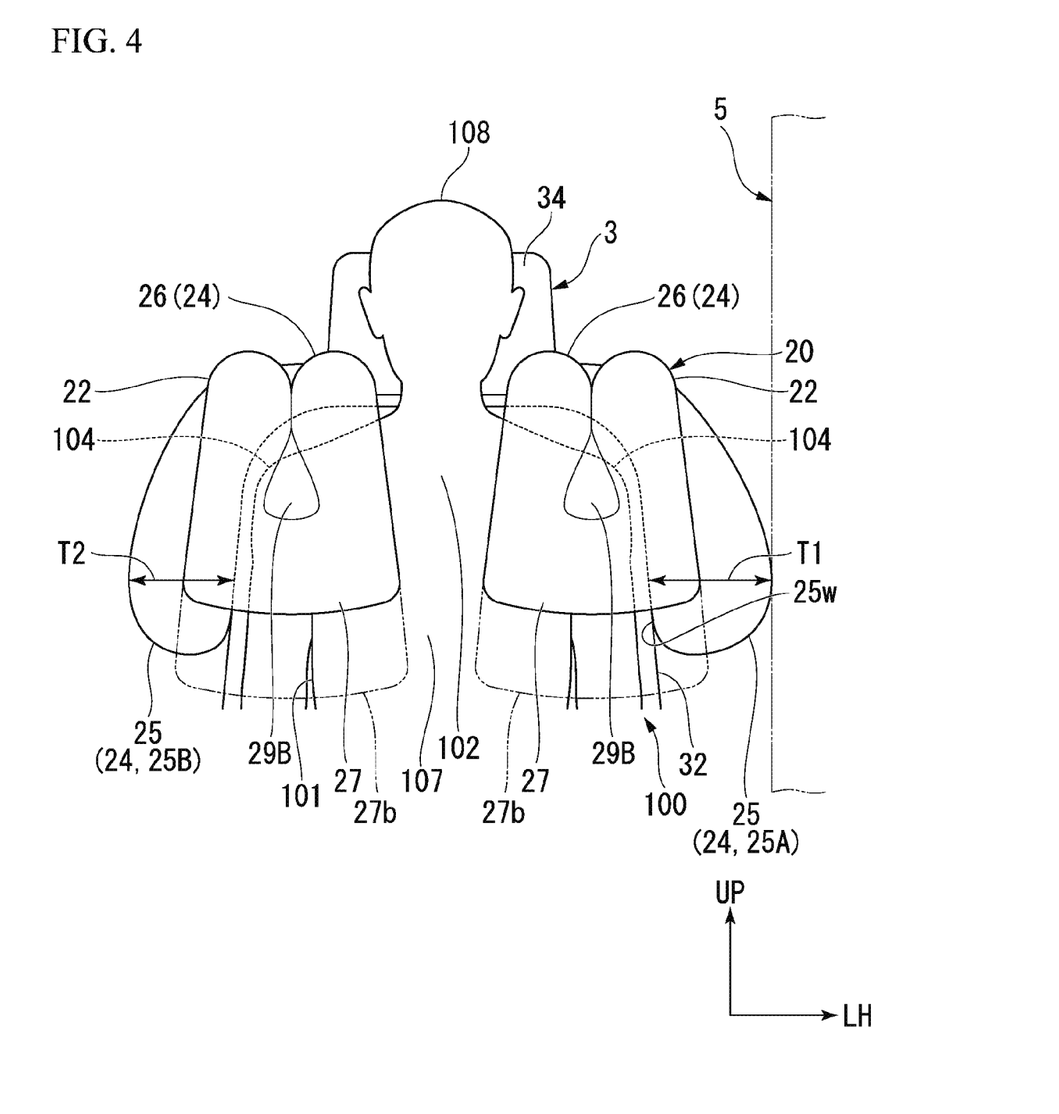
FIG. 4 is a view showing a state in which the air-bag apparatus is expanded and is a view of the vehicle seat on which the air-bag apparatus of the embodiment is mounted when seen from a vehicle frontward direction.

FIG. 3 is a view showing a state in which the air-bag apparatus of the embodiment is expanded, and is a perspective view of the vehicle seat on which the air-bag apparatus of the embodiment is mounted. FIG. 4 is a view showing a state in which the air-bag apparatus of the embodiment is expanded, and is a view of the vehicle seat on which the air-bag apparatus of the embodiment is mounted when seen from a vehicle frontward direction.

As shown in FIG. 1, FIG. 3, and FIG. 4, the pair of bag bodies 22 are accommodated inside the seat back 32, for example, in a folded state or a wound state and are inflated and expanded from the seat back 32 upon supply of the gas from the inflator 21. The pair of bag bodies 22 are attached to a frame that forms the seat back 32. Each of the bag bodies 22 is formed of a single base fabric or a plurality of base fabrics sewn together in a sack shape. The following description regarding the bag body 22 describes a state (state shown in FIG. 1, FIG. 3, and FIG. 4) in which the expansion of the bag body 22 has been completed unless otherwise stated.

Each of the pair of bag bodies 22 is arranged from the side of the seat back main body 33 to the front of the body of the occupant. Each of the bag bodies 22 breaks the stitching of the cover and the like and is expanded from a side surface 33s of the seat back main body 33.

Each of the pair of bag bodies 22 includes a front extension part 24 and a front bag 27.

The front extension part 24 extends from the side in the width direction of the seat back 32 toward the front of the vehicle 1. In the first embodiment, the front extension part 24 includes a side bag 25 and an upper bag 26.

The side bag 25 extends forward from the side in the width direction of the seat back 32 through the side (side surface) of a body 101 of an occupant 100. The side bag 25 extends in a cylindrical form that extends in a front-to-rear direction and covers an upper part of an arm and a shoulder part 104 the occupant 100 from a lateral direction.

The upper bag 26 is provided via a continuously connecting part 28 that extends upward continuously from a rear end part of the side bag 25. The upper bag 26 extends frontward from the continuously connecting part 28 and is expanded to cover an upper surface of the shoulder part 104 above the body 101 of the occupant 100.

As shown in FIG. 4, in the pair of bag bodies 22, a thickness T1 in the right-to-left direction (the width direction of the vehicle 1) of a side bag 25A provided on the door 5 side of the vehicle 1 is formed to be larger than a thickness T2 of a side bag 25B on the opposite side of the door 5 side.

As shown in FIG. 1, FIG. 3, and FIG. 4, the front bag 27 is provided continuously to the front extension part 24. In the first embodiment, the front bag 27 is provided continuously to a front end part of the side bag 25 and a front end part of the upper bag 26. The front bag 27 is expanded to the front side of the occupant 100 seated on the vehicle seat 3 and comes into contact with only an upper portion 102 of a front surface of the body 101 of the occupant 100. Specifically, the front bag 27 is provided to come into contact with a clavicle of the body 101 and a plurality of ribs from the top of the rib (for example, from a top rib to a second rib). A lower part of the front bag 27 terminates, for example, at a height of a second rib from above and does not come into contact with a region (a lower part 107 of the front surface of the body 101) of third and subsequent ribs from above. Thereby, the strength of the force for holding the occupant is relatively changed in the vertical direction of the front bag 27.

As indicated by a two-dot chain line in FIG. 1, FIG. 3, and FIG. 4, the front bag 27 may include a front lower bag 27b that comes into contact with the region (lower part 107) of third and subsequent ribs from above more weakly than the upper portion 102. The front lower bag 27b has, for example, a hole, a cutout, a fragile part, and the like to weaken the contact force. Thereby, the strength of the force for holding the occupant is relatively changed in the vertical direction of the front bag 27.

As shown in FIG. 1, such a front bag 27 is provided to be inflated and expanded between the bag body 12 provided on the steering wheel or the console 4 and the body 101 of the occupant 100.

A tether 50 having a band shape is provided inside the bag body 22 such that the side bag 25, the upper bag 26, and the front bag 27 are expanded along an upper part of a side surface of the body 101 and the upper portion 102 of the front surface of the body 101 of the occupant 100.

Non-expansion parts 29A, 29B which is formed such that opposing base fabrics of the bag bodies are sewn together and which does not inflate at the time of expansion are formed on the side bag 25 and the front bag 27. By forming the non-expansion part 29A, the side bag 25 is expanded while forming a curved surface 25w (refer to FIG. 4) that comes into contact with the upper part of the arm of the occupant 100. By forming the non-expansion part 29B, the front bag 27 is expanded while forming a curved surface 27w (refer to FIG. 1) that comes into contact with the upper portion 102 of the front surface of the body 101.

In the bag body 22, the side bag 25, the upper bag 26, and the front bag 27 are continuously provided on an outer circumference side of the non-inflation parts 29A, 29B.

The inflator 21 supplies the gas into the bag body 22 in the vicinity of a rear end part of the side bag 25.

Each of the pair of bag bodies 22 is inflated and expanded in the order of the side bag 25, the upper bag 26, and the front bag 27 when the gas is supplied from the inflator 21.

Hereinafter, the operation of the main air-bag apparatus 10 and the seat air-bag apparatus 20 will be described.

When an impact is input to the vehicle, each of the inflator 11 of the main air-bag apparatus 10 and each inflator 21 of the seat air-bag apparatus 20 generates a high-pressure gas. When the gas is generated from the inflator 11, the bag body 12 of the main air-bag apparatus 10 is inflated and expanded upon supply of the gas.

Further, when the gas is generated from the inflator 21, the side bag 25 is inflated and expanded first upon supply of the gas. When the side bag 25 is inflated and expanded to some extent, the gas is supplied to the upper bag 26 from the rear end part of the side bag 25 through the continuously connecting part 28, and the upper bag 26 is inflated and expanded.

Then, the gas is supplied to the front bag 27 from the front end part of the side bag 25 and the front end part of the upper bag 26. Thereby, the front bag 27 is inflated and expanded in front of the upper portion 102 of the body 101 of the occupant 100. The expansion shape of the front bag 27 is a shape that covers the upper portion 102 of the body 101 of the occupant 100 from the front by a tensile force of the tether 50 and maintains the holding force of the body of the occupant 100. The front bag 27 is interposed between the upper portion 102 of the body 101 and the bag body 12 of the main air-bag apparatus 10 that is inflated and expanded from the steering wheel or the console 4.

Accordingly, the operation of the main air-bag apparatus 10 and seat air-bag apparatus 20 is completed.

As described above, in the above-described embodiment, the front bag 27 is provided continuously to each of the pair of front extension parts 24 each of which extends in the vehicle frontward direction from each of both sides in the width direction of the seat back 32, and the front bag 27 is expanded to the front side of the occupant 100 seated on the vehicle seat 3.

Thereby, it is possible to reduce the amount of movement of the body 101 of the occupant 100 to the vehicle frontward direction. Further, the front bag 27 comes into contact with the upper portion 102 of the front surface of the body 101 of the occupant 100. The upper portion 102 of the body 101 of the occupant 100, that is, for example, the clavicle or, for example, a part from the top of the rib to several ribs has a high resistance characteristic to a load applied from the front as compared to a lower part than the several ribs. In this way, the front bag 27 comes into contact with the upper portion 102 of the front surface of the body 101 having a high resistance characteristic to a load. The front lower bag 27b weakly comes into contact with the lower part 107 of the front surface of the body 101 having a low resistance characteristic to a load, or the front bag 27 does not come into contact with the lower part 107 of the front surface of the body 101 having a low resistance characteristic to a load. Thereby, it is possible to prevent an impact from being applied to the lower part 107 having a low resistance characteristic to a load applied from the frontward direction below the upper portion 102 of the body 101. Accordingly, even if the body 101 of the occupant 100 is displaced to swing frontward and hits the bag body 22 at the time of collision, it is possible to mitigate the impact which is received by the occupant 100.

Further, the front extension part 24 includes the side bag 25 and the upper bag 26. Thereby, the front extension part 24 covers the upper portion 102 of a side part 103 of the body 101 and the shoulder part 104 of the occupant 100, and it is possible to mitigate the impact which is received by the occupant 100.

Further, the bag body 22 is inflated and expanded in the order of the side bag 25, the upper bag 26, and the front bag 27. Thereby, by the side bag 25 being inflated and expanded first, it is possible to prevent the body 101 of the occupant 100 from being displaced laterally in the right-to-left direction and diagonally frontward, and the body 101 of the occupant 100 can be guided to displace toward the vehicle frontward direction where the main air-bag apparatus 10 is provided. Next, by the upper bag 26 being inflated and expanded, an upward displacement of the body 101 of the occupant 100 is prevented. Then, by the front bag 27 being inflated and expanded, it becomes easy to reliably receive the upper part 102 of the body 101 of the occupant 100 by the front bag 27.

Further, the non-inflation part 29B is provided on part of the front bag 27. Thereby, it is possible to reduce the volume that is inflated and expanded by the gas inside the bag body 22. Thereby, the inflation and expansion of the bag body 22 is quickly performed. Further, in the front bag 27, a surface of a portion that comes into contact with the upper portion 102 of the body 101 of the occupant 100 around the non-inflation part 29B can be formed of the curved surface 27w, and the load applied to the body 101 of the occupant 100 can be dispersed.

Further, the side bag 25A provided on the door 5 side is formed to have a larger thickness T1 in the inflated and expanded state than the side bag 25B on the opposite side. Thereby, the side bag 25A is interposed between the door 5 and the side surface of the body 101 of the occupant 100, and it is possible to enhance buffering characteristics in a state where the side bag 25A on the door 5 side is inflated and expanded. Further, in a case where the side surface of the body 101 of the occupant 100 hits the side bag 25A, the side bag 25A is also supported by a reaction force from the door 5. Thereby, it is possible to further reliably receive the occupant 100 by the side bag 25A on the door 5 side.

Further, the bag body 22 having the front bag 27 that comes into contact with the upper part 102 of the front surface of the body 101 of the occupant 100 is inflated and expanded between the occupant 100 and the bag body 12 inflated and expanded from the steering wheel or the console 4 in front of the occupant 100. Thereby, when the body 101 and the head part 108 of the occupant 100 are displaced such that the body 101 and the head part 108 are swung frontward around the waist part that is held by the seat belt, the bag body 22 and the bag body 12 can receive the displacement, and it is possible to reduce the impact applied on the occupant 100.

In the above-described embodiment, the seat air-bag apparatus 20 includes the side bag 25 and the upper bag 26 as the front extension part 24A but may include only any one of the side bag 25 and the upper bag 26.

Further, in the above-described embodiment, a bag body (front lower bag 27b) having a lower tensile force than the front bag 27 may be provided on a lower side of the front bag 27 of the seat air-bag apparatus 20. By lowering the tensile force of the bag body provided on the lower side of the front bag 27, it is possible to reduce an impact to the portion having a low resistance characteristic of the body 101 of the occupant 100.

Second Embodiment

Next, an air-bag apparatus and an air-bag system according to a second embodiment of the present invention will be described. The air-bag apparatus and the air-bag system in the second embodiment described below have a different configuration of the bag body of the seat air-bag apparatus from that of the air-bag apparatus in the first embodiment described above. In the following description, the configuration common to the first embodiment is indicated using the same reference numeral in the drawings, and the description thereof may be omitted.

Figure 5:
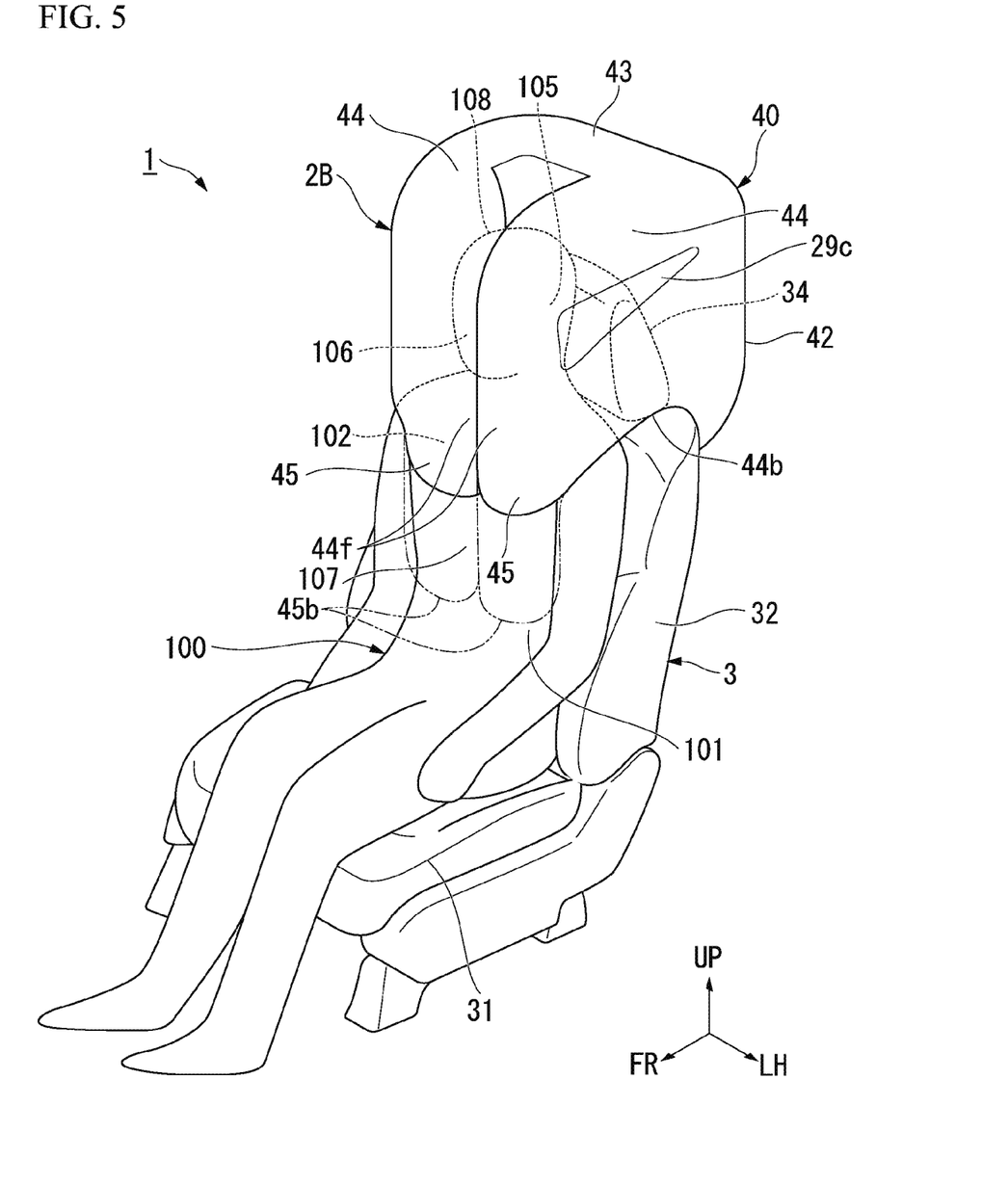
FIG. 5 is a perspective view showing a state in which, in the vehicle seat on which an air-bag apparatus according to a second embodiment of the present invention is mounted, the air-bag apparatus of the second embodiment is expanded.
Figure 6:
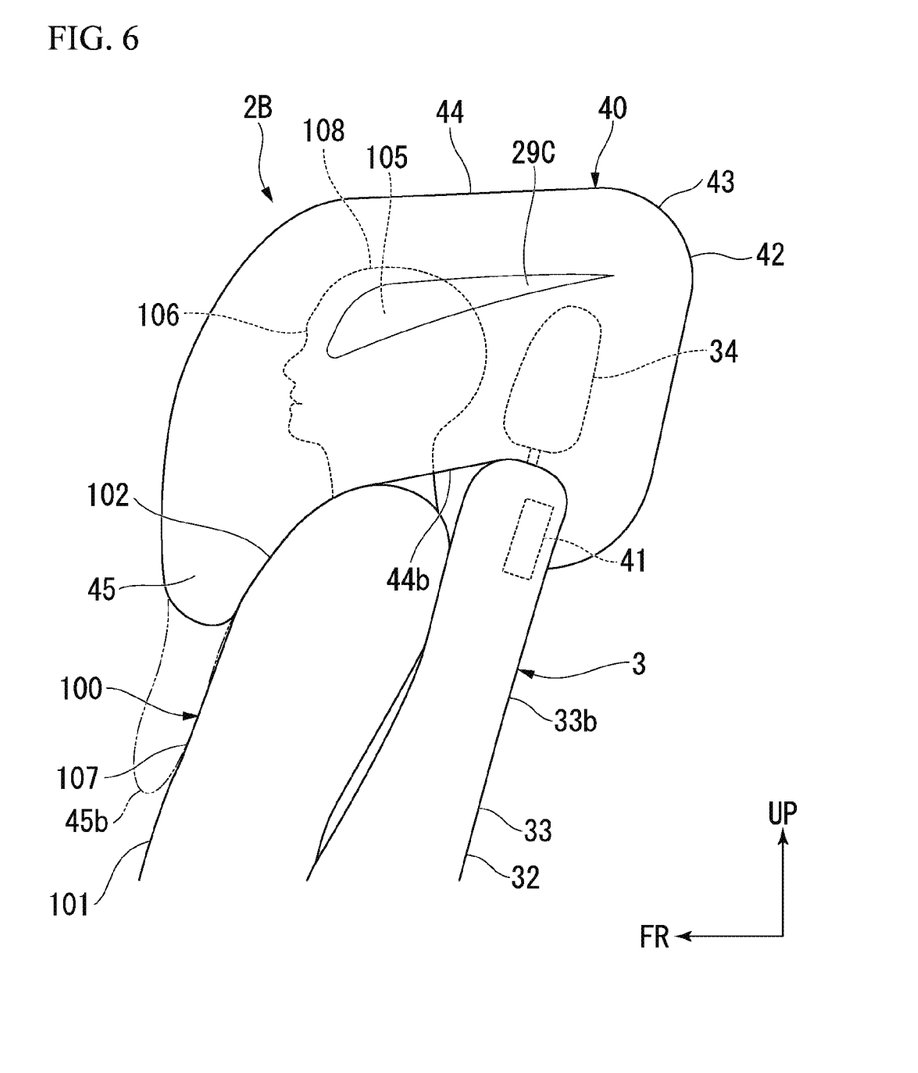
FIG. 6 is a side view showing a state in which, in the vehicle seat on which the air-bag apparatus according to the second embodiment is mounted, the air-bag apparatus of the second embodiment is expanded.

FIG. 5 is a perspective view showing a state in which, in the vehicle seat on which an air-bag apparatus according to the second embodiment of the present invention is mounted, the air-bag apparatus is expanded. FIG. 6 is a side view showing a state in which, in the vehicle seat on which the air-bag apparatus according to the second embodiment of the present invention is mounted, the air-bag apparatus is expanded.

As shown in FIG. 5 and FIG. 6, the vehicle 1 includes an air-bag system 2B inside a room.

The air-bag system 2B includes a main air-bag apparatus (not shown) that is provided on the steering wheel or the console 4 and a seat air-bag apparatus (air-bag apparatus) 40 that is provided on the vehicle seat 3.

The seat air-bag apparatus 40 is embedded in the seat back 32. In the present embodiment, the seat air-bag apparatus 40 is embedded in the head rest 34 or an upper part of a rear surface of the seat back main body 33. The seat air-bag apparatus 40 holds the upper part of the upper body of the occupant at the time of operation. The seat air-bag apparatus 40 includes an inflator 41 and a bag body 42.

The inflator 41 generates a high-pressure gas at the time of an impact input to the vehicle. The inflator 41 is attached to a frame that forms the seat back 32.

The bag body 42 is accommodated inside the seat back 32, for example, in a folded state or a wound state, and is inflated and expanded from the seat back 32 upon supply of the gas from the inflator 41. The bag body 42 is attached to a frame that forms the seat back 32. The bag body 42 is formed of a single base fabric or a plurality of base fabrics sewn together in a sack shape. The following description regarding the bag body 42 describes a state in which the expansion of the bag body 42 has been completed unless otherwise stated.

The bag body 42 breaks the stitching of the cover and the like and is expanded from a rear surface 33b of the seat back main body 33 or the head rest 34. The bag body 42 includes a rear bag 43, a pair of front extension parts 44, and a pair of front bags 45.

The rear bag 43 stands upward from the rear surface 33b of the seat back main body 33 or the head rest 34. The rear bag 43 stands further upward than an upper end of the head rest 34. The rear bag 43 is formed such that a width size in the right-to-left direction is larger than a width size of the head rest 34.

Each of the pair of front extension parts 44 extends from each of both sides in the width direction of the rear bag 43 toward a frontward direction of the vehicle 1. The pair of front extension parts 44 is provided such that a spacing in the right-to-left direction is gradually reduced toward the frontward direction. That is, each of the front extension parts 44 extends obliquely frontward so as to approach a center side in the width direction of the seat back main body 33 from a side in the width direction of the rear bag 43. Thereby, the bag body 42 defines a substantially triangular shape in a plan view. Front end parts 44f of the pair of front extension parts 44 may be connected to each other.

The pair of front extension parts 44 expands so as to cover a front surface 106 and a side surface 105 of the head part 108 of the occupant 100. A lower end part 44b of the front extension part 44 expands so as to cover an upper surface of the shoulder part 104 of the body 101 of the occupant 100.

Each of the pair of front bags 45 is provided to extend downward from a front end part 44f of each of the pair of front extension parts 44. The front bag 45 is continuously formed on a lower side of the front end part 44f of the front extension part 44. The front bag 45 communicates with the front extension part 44. The front bag 45 is expanded to the front side of the occupant 100 seated on the vehicle seat 3 and comes into contact with only the upper portion 102 of the front surface of the body 101 of the occupant 100. Specifically, the front bag 45 is provided to come into contact with a clavicle of the body 101 and a plurality of ribs from the top of the rib (for example, from a top rib to a second rib). A lower part of the front bag 45 terminates, for example, at a height of a second rib from above and does not come into contact with a region (the lower part 107 of the front surface of the body 101) of third and subsequent ribs from above. Thereby, the strength of the force for holding the occupant is relatively changed in the vertical direction of the front bag 45.

As indicated by a two-dot chain line in FIG. 5 and FIG. 6, the front bag 45 may include a front lower bag part 45b that comes into contact with the region (lower part 107) of third and subsequent ribs from above more weakly than the upper portion 102. The front lower bag part 45b has, for example, a hole, a cutout, a fragile part, and the like to weaken the contact force. Thereby, the strength of the force for holding the occupant is relatively changed in the vertical direction of the front bag 45.

Such a front bag 45 may be provided to be inflated and expanded between the bag body 12 provided on the steering wheel or the console 4 and the body 101 of the occupant 100 similarly to the configuration shown in FIG. 1.

A tether (not shown) having a band shape is provided inside the bag body 42 such that the rear bag 43, the front extension part 44, and the front bag 45 are expanded as described above.

A non-expansion part 29C which is formed such that the opposing base fabrics of the bag body are sewn together and which does not inflate at the time of expansion is formed on the front extension part 44. The front extension part 44 expands annularly to surround the non-expansion part 29C by forming the non-expansion part 29C.

The inflator 41 supplies the gas in the bag body 42 inside the rear bag 43. The bag body 42 is provided such that the rear bag 43, the front extension part 44, and the front bag 45 are inflated and expanded in this order when the gas is supplied from the inflator 41.

Hereinafter, the operation of the main air-bag apparatus 10 and the seat air-bag apparatus 40 will be described.

When an impact is input to the vehicle, the inflator 41 of the seat air-bag apparatus 40 generates a high-pressure gas. When the gas is generated from the inflator 41, the rear bag 43 is inflated and expanded first upon supply of the gas. When the rear bag 43 is inflated and expanded, the gas is supplied from both sides in the width direction of the rear bag 43 to the pair of front extension parts 44, and the pair of front extension parts 44 are inflated and expanded.

Then, the gas is supplied to the front bag 45 from the pair of front extension parts 44. Thereby, the front bag 45 is inflated and expanded in front of the upper part 102 of the body 101 of the occupant 100.

Accordingly, the operation of the seat air-bag apparatus 40 is completed.

As described above, in the second embodiment, the front bag 45 is provided continuously to each of the pair of front extension parts 44 each of which extends in the vehicle frontward direction from each of both sides in the width direction of the seat back 32, and the front bag 45 is expanded to the front side of the occupant 100 seated on the vehicle seat 3. Thereby, it is possible to reduce the amount of movement of the body 101 of the occupant 100 to the vehicle frontward direction. Further, the front bag 45 comes into contact with the upper portion 102 of the front surface of the body 101 having a high resistance characteristic to a load. The front lower bag part 45b weakly comes into contact with the lower part 107 of the front surface of the body 101 having a low resistance characteristic to a load, or the front bag 45 does not come into contact with the lower part 107 of the front surface of the body 101 having a low resistance characteristic to a load. Thereby, even if the body 101 of the occupant 100 is displaced to swing frontward and hits the bag body 42 at the time of collision, it is possible to mitigate the impact which is received by the occupant 100.

Further, the pair of front extension parts 44 are along the side surface 105 and the front surface 106 of the head part 108 of the occupant 100. Thereby, it is possible to reduce the amount of movement of the head part 108 of the occupant 100 to the vehicle frontward direction. Thereby, it is possible to prevent the head part 108 of the occupant 100 from hitting a member and the like provided in front.

In the second embodiment, similarly to the first embodiment, the thickness of the front extension part 44 provided on the door 5 side may be formed to be larger than the thickness of the front extension part 44 on the opposite side.

The configurations in the above-described embodiments are examples of the present invention, and various changes can be made without departing from the scope of the present invention.

What is claimed is:

1. An air-bag apparatus, comprising:
an inflator that generates a gas at a time of an impact input; and
a bag body that is inflated and expanded from a seat back of a vehicle seat upon supply of the gas from the inflator,
wherein the bag body comprises
a pair of front extension parts each of which extends in a vehicle frontward direction from each of both sides in a width direction of the seat back, and
a front bag that is provided continuously to the front extension part, that is expanded to a frontward side of an occupant seated on the vehicle seat, and that comes into contact with an upper part of a body of the occupant, and
the front bag comprises a front lower bag part that comes into contact with a lower part below the upper part of the body of the occupant more weakly than the upper part or comes into no contact with the lower part.

2. The air-bag apparatus according to claim 1, wherein the pair of front extension parts comprises:
a pair of side bags each of which is expanded to each of both sides in a width direction of the body of the occupant, comes into contact with a side surface of the body, and is connected to the front bag; and
a pair of upper bags each of which is expanded above the body of the occupant and comes into contact with an upper surface of a shoulder part of the occupant.

3. The air-bag apparatus according to claim 2, wherein the bag body is provided to be inflated and expanded in an order of the side bag, the upper bag, and the front bag upon supply of the gas from the inflator.

4. The air-bag apparatus according to claim 1, wherein a non-inflation part is provided on part of the front bag.

5. The air-bag apparatus according to claim 1, wherein a front extension part that is provided on a door side of a vehicle among the pair of the front extension parts is formed to have a larger thickness in a width direction of the vehicle in an inflated and expanded state than a front extension part on an opposite side of the door side of the vehicle among the pair of the front extension parts.

6. The air-bag apparatus according to claim 1, wherein each of the pair of front extension parts is expanded to each of both sides in a width direction of the vehicle seat to interpose a head part of the occupant and is along a side surface and a front surface of the head part.

7. An air-bag system, comprising:
the air-bag apparatus according to claim 1; and
a second air-bag apparatus that is provided in front of the occupant,
wherein the second air-bag apparatus comprises:
a second inflator that generates a gas at a time of an impact input; and
a second bag body that is inflated and expanded upon supply of the gas from the second inflator, and
the front bag of the bag body is inflated and expanded between the second bag body and the body of the occupant.

* * * * *